United States Patent
Hirata

(10) Patent No.: US 6,320,824 B1
(45) Date of Patent: Nov. 20, 2001

(54) METHOD AND APPARATUS FOR CONTROLLING AND REVERSING THE POSITION OF OPTICAL PICKUP HEAD

(75) Inventor: Minoru Hirata, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/291,949

(22) Filed: Apr. 15, 1999

(30) Foreign Application Priority Data

Oct. 30, 1998 (JP) ................................................. 10-310922

(51) Int. Cl.[7] ...................................................... G11B 7/00
(52) U.S. Cl. ....................... 369/32; 369/53.29; 369/53.39
(58) Field of Search ............................. 369/44.14, 44.15, 369/53.29, 53.39, 32

(56) References Cited

U.S. PATENT DOCUMENTS

| | | | |
|---|---|---|---|
| 4,481,613 | 11/1984 | Yokota | .................................... 369/56 |
| 4,853,915 | 8/1989 | Takasago et al. | ....................... 369/32 |
| 5,485,445 | 1/1996 | Oinoue et al. . | |
| 5,805,542 | 9/1998 | Soma et al. | ........................ 369/44.26 |

*Primary Examiner*—Nabil Hindi
(74) *Attorney, Agent, or Firm*—Louis Woo

(57) ABSTRACT

A first electrically conductive member is provided on a control portion of a limit position switch for detecting whether or not an optical pickup head reaches a predetermined limit position. A body of the optical pickup head is provided with a second electrically conductive member. The second electrically conductive member moves into contact with the first electrically conductive member when the optical pickup head reaches the predetermined limit position. The second electrically conductive member moves out of contact with the first electrically conductive member when the optical pickup head separates from the predetermined limit position. The second electrically conductive member is electrically connected to an electric portion subjected to a reference potential. Detection is made as to whether or not a potential of the first electrically conductive member is equal to the reference potential. The optical pickup head is reversed when it is detected that the potential of the first electrically conductive member is equal to the reference potential.

4 Claims, 5 Drawing Sheets

TRAVERSE DIRECTION

METHOD AND APPARATUS FOR CONTROLLING AND REVERSING THE POSITION OF OPTICAL PICKUP HEAD

BACKGROUND OF THE INVENTION

1. Field of the Invention

This invention relates to a method of controlling the position of an optical pickup head in an optical disc drive apparatus such as a CD (compact disc) drive apparatus, an MD (mini disc) drive apparatus, or a DVD (digital versatile disc) drive apparatus. This invention also relates to an apparatus for controlling the position of an optical pickup head in an optical disc drive apparatus. This invention further relates to an apparatus for detecting the position of an optical pickup head in an optical disc drive apparatus.

2. Description of the Related Art

A prior-art CD (compact disc) player includes an optical pickup head. When a CD is placed in the player, the optical pickup head starts to read out information from the CD. The prior-art CD player also includes a microcomputer and a traverse motor. The traverse motor serves to move the optical pickup head along a traverse direction between an inner most position and an outermost position with respect to the CD. The microcomputer is programmed to control the traverse motor.

The prior-art CD player further includes an innermost position switch connected to the microcomputer. When the optical pickup head reaches its innermost position, the body of the head encounters a control arm of the innermost position switch and changes the switch to its ON state. In this case, the microcomputer is informed that the innermost position switch changes to its ON state. The change of the innermost position switch to its ON state indicates that the optical pickup head reaches its innermost position. The microcomputer reverses the traverse motor in response to the change of the innermost position switch to its ON state. Accordingly, when the optical pickup head reaches its innermost position, the traverse motor is reversed so that the optical pickup head stops and then starts to move back toward its outermost position.

In the prior-art CD player, the connection between the innermost position switch and the microcomputer includes a pair of wiring lines, and a 2-pin connector. A simpler connection between the innermost position switch and the microcomputer has been desired.

SUMMARY OF THE INVENTION

It is a first object of this invention to provide a simple method of controlling the position of an optical pickup head.

It is a second object of this invention to provide a simple apparatus for controlling the position of an optical pickup head.

It is a third object of this invention to provide a simple apparatus for detecting the position of an optical pickup head.

A first aspect of this invention provides a method of controlling a position of an optical pickup head. The method comprises the steps of providing a first electrically conductive member on a control portion of a limit position switch for detecting whether or not the optical pickup head reaches a predetermined limit position; providing a body of the optical pickup head with a second electrically conductive member which moves into contact with the first electrically conductive member when the optical pickup head reaches the predetermined limit position, and which moves out of contact with the first electrically conductive member when the optical pickup head separates from the predetermined limit position; electrically connecting the second electrically conductive member to an electric portion subjected to a reference potential; detecting whether or not a potential of the first electrically conductive member is equal to the reference potential; and reversing the optical pickup head when it is detected that the potential of the first electrically conductive member is equal to the reference potential.

A second aspect of this invention provides a method of controlling a position of an optical pickup head. The method comprises the steps of providing a first electrically conductive member which is fixed; providing a body of the optical pickup head with a second electrically conductive member which moves into contact with the first electrically conductive member when the optical pickup head reaches a predetermined limit position, and which moves out of contact with the first electrically conductive member when the optical pickup head separates from the predetermined limit position; electrically connecting the second electrically conductive member to an electric portion subjected to a reference potential; detecting whether or not a potential of the first electrically conductive member is equal to the reference potential;

and reversing the optical pickup head when it is detected that the potential of the first electrically conductive member is equal to the reference potential.

A third aspect of this invention provides an apparatus for controlling a position of an optical pickup head. The apparatus comprises a first electrically conductive member; a second electrically conductive member provided on a body of the optical pickup head, the second electrically conductive member moving into contact with the first electrically conductive member when the optical pickup head reaches a predetermined limit position, the second electrically conductive member moving out of contact with the first electrically conductive member when the optical pickup head separates from the predetermined limit position; means for electrically connecting the second electrically conductive member to an electric portion subjected to a reference potential; means for detecting whether or not a potential of the first electrically conductive member is equal to the reference potential; and means for reversing the optical pickup head when it is detected that the potential of the first electrically conductive member is equal to the reference potential.

A fourth aspect of this invention is based on the third aspect thereof, and provides an apparatus further comprising a control circuit for the optical pickup head, the connecting means including means for electrically connecting the second electrically conductive member to a ground in the control circuit.

A fifth aspect of this invention is based on the third aspect thereof, and provides an apparatus further comprising a limit position switch for detecting whether or not the optical pickup head reaches the predetermined limit position, the limit position switch having first and second contacts, the first contact being electrically connected to the first electrically conductive member, the second contact being electrically connected to the detecting means.

A sixth aspect of this invention is based on the third aspect thereof, and provides an apparatus further comprising a suspension chassis for supporting the optical pickup head, an insulating member mounted on the suspension chassis, and the first electrically conductive member being provided on the insulating member.

A seventh aspect of this invention provides an apparatus for detecting a position of a movable optical pickup head. The apparatus comprises a first electrically conductive member; a second electrically conductive member provided on a body of the optical pickup head, the second electrically conductive member moving into contact with the first electrically conductive member when the optical pickup head reaches a predetermined limit position, the second electrically conductive member moving out of contact with the first electrically conductive member when the optical pickup head separates from the predetermined limit position; and means for detecting whether the second electrically conductive member moves into or out of contact with the first electrically conductive member to decide whether the optical pickup head moves to or from the predetermined limit position.

An eighth aspect of this invention provides an apparatus for detecting a position of a movable optical pickup head. The apparatus comprises a first electrically conductive member; a second electrically conductive member provided on a body of the optical pickup head, the second electrically conductive member moving into contact with the first electrically conductive member when the optical pickup head reaches a predetermined limit position, the second electrically conductive member moving out of contact with the first electrically conductive member when the optical pickup head separates from the predetermined limit position; a microcomputer including first and second terminals, the first terminal being grounded; means for electrically connecting the first electrically conductive member to the second terminal of the microcomputer; and means for grounding the second electrically conductive member via the body of the optical pickup head.

A ninth aspect of this invention is based on the eighth aspect thereof, and provides an apparatus wherein the connecting means consists of a single wiring line and a 1-pin connector, the wiring line extending between the first electrically conductive member and the second terminal of the microcomputer, the 1-pin connector being interposed in the wiring line.

A tenth aspect of this invention is based on the eighth aspect thereof, and provides an apparatus further comprising a power feed line subjected to a positive potential, and a resistor connected between the power feed line and the first electrically conductive member.

DESCRIPTION OF THE PREFERRED EMBODIMENTS

Figure 1:
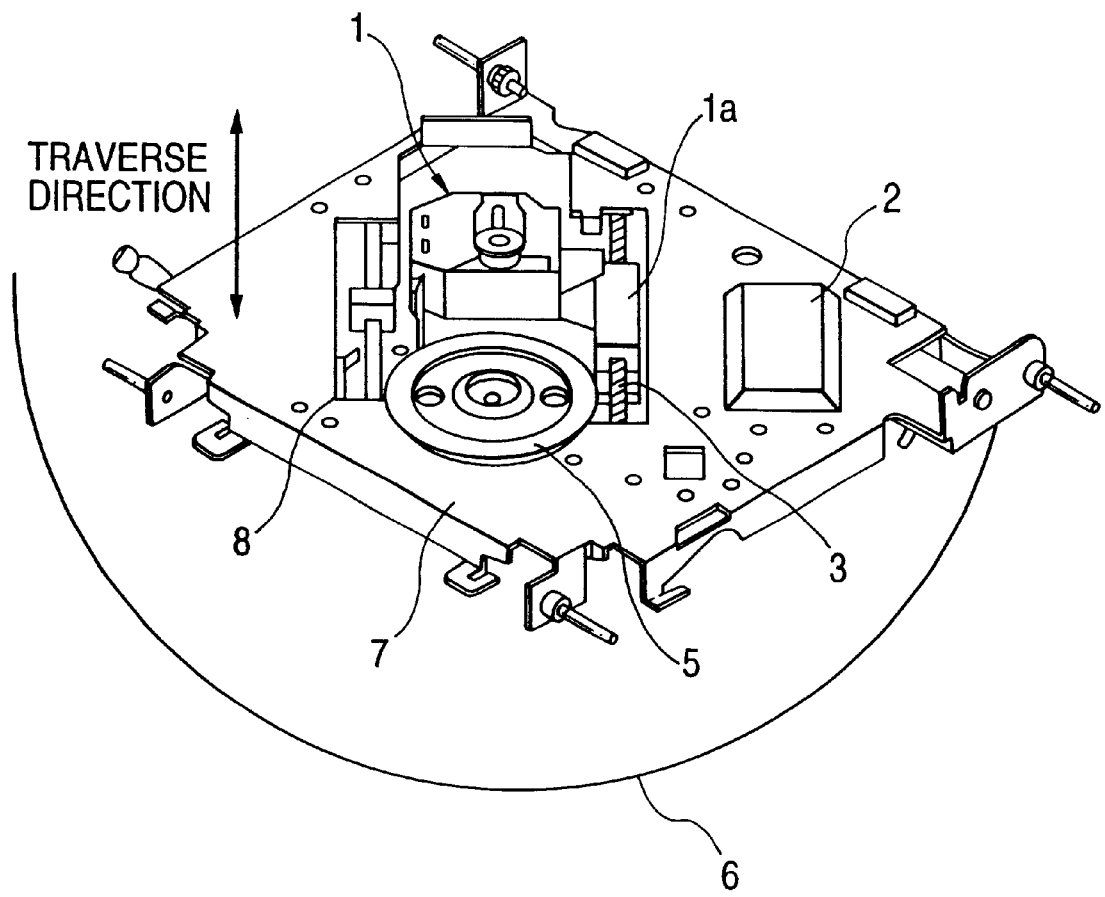
FIG. 1 is a perspective view of a portion of a prior-art CD player.

A prior-art CD player will be explained below for a better understanding of this invention. FIG. 1 shows a portion of the prior-art CD player which is assembled on a suspension chassis 7. As shown in FIG. 1, an optical pickup head 1, a traverse motor 2, a lead screw 3, and a guide shaft 4 are provided on the suspension chassis 7.

The optical pickup head 1 can move along a traverse direction between an innermost position and an outermost position with respect to a disc (a compact disc, that is, a CD) 6 placed in the player. The guide shaft 4 extends along the traverse direction. The optical pickup head 1 has a portion engaging the guide shaft 4. The optical pickup head 1 is guided by the guide shaft 4 during its movement in the traverse direction.

The optical pickup head 1 includes an engagement portion 1a having a threaded hole through which the lead screw 3 extends.

The engagement portion 1a meshes with the lead screw 3. The lead screw 3 is coupled to an output shaft of the traverse motor 2 via a gear train so that the lead screw 3 can be rotated by the traverse motor 2. As the lead screw 3 rotates, the optical pickup head 1 moves in the traverse direction.

The disc 6 can be held in position by a disc damper 5 provided on the suspension chassis 7. When the disc 6 is placed in the player, the disc 6 is held by the disc damper 5. Then, the optical pickup head 1 is moved to its innermost position.

Figure 2:
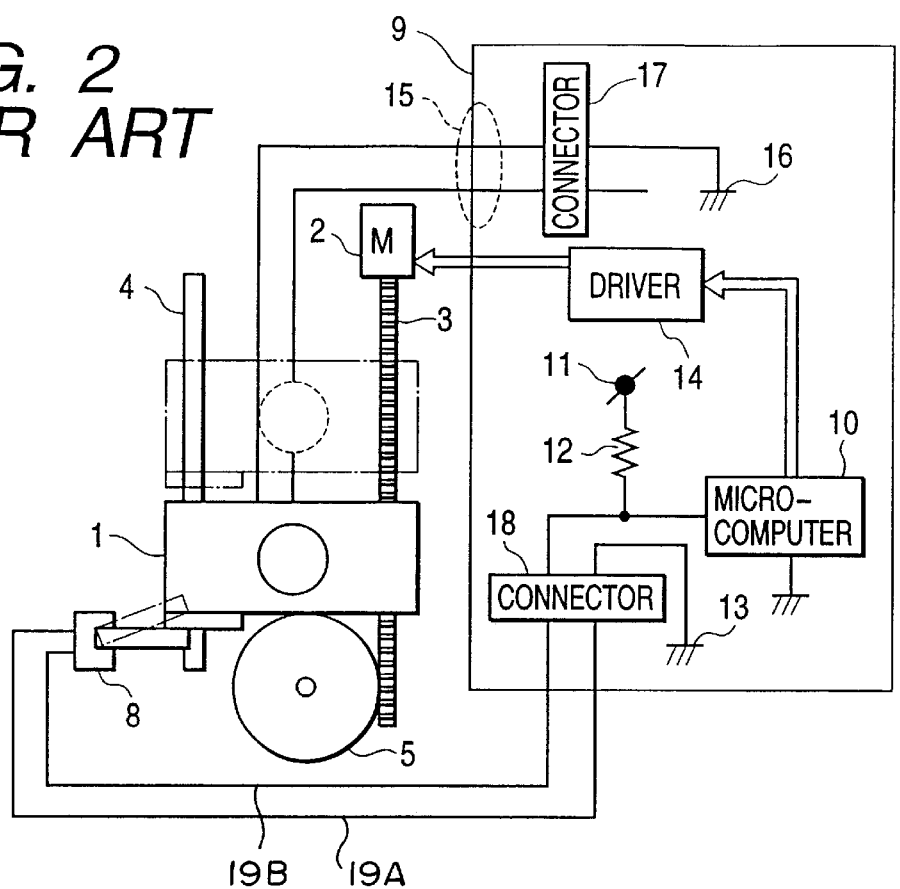
FIG. 2 is a diagram of an optical pickup head, a traversing mechanism for the head, and a control circuit in the prior-art CD player of FIG. 1.
Figure 3:
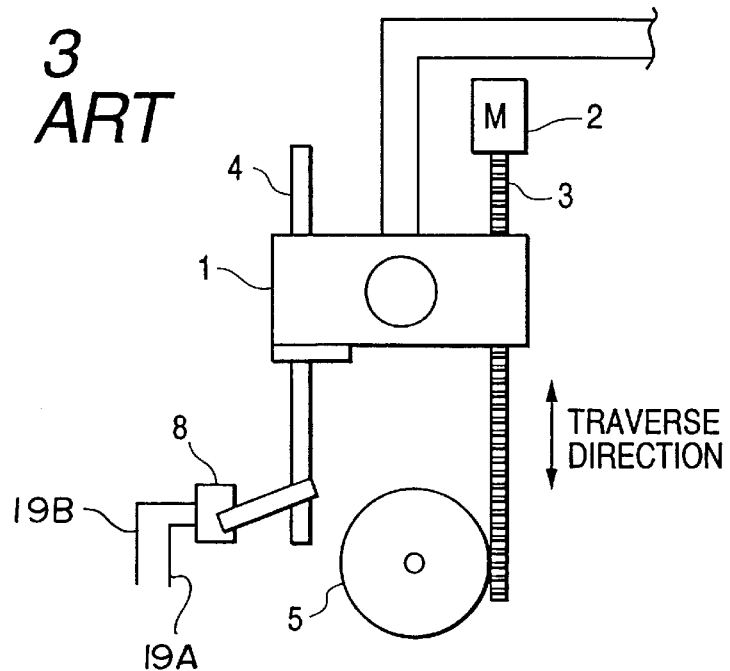
FIG. 3 is a diagram of the optical pickup head and the traversing mechanism for the head in the prior-art CD player of FIG. 1.

The prior-art CD player of FIG. 1 includes an innermost position switch 8 of a push type which is provided on the suspension chassis 7 near an end of the guide shaft 4. When the optical pickup head 1 reaches its innermost position, the body of the head 1 encounters a control arm of the innermost position switch 8 and changes the switch 8 to its ON state. Accordingly, the change of the innermost position switch 8 to its ON state indicates that the optical pickup head 1 reaches its innermost position. The innermost position switch 8 includes a return spring which urges the control arm. The return spring causes the innermost position switch 8 to be normally in its OFF state The innermost position switch 8 has a pair of a fixed contact and a movable contact. The movable contact is connected with and disconnected from the fixed contact in accordance with movement of the control arm of the switch 8. As shown in FIG. 2, when the optical pickup head 1 assumes its innermost position, the body of the head 1 engages the control arm of the innermost position switch 8 so that the movable contact of the switch 8 touches the fixed contact thereof. Accordingly, in this case, the innermost position switch 8 changes to its ON state. As shown in FIG. 3, when the optical pickup head 1 moves out of its innermost position, the body of the head 1 separates from the control arm of the innermost position switch 8 so that the movable contact of the switch 8 is disconnected from the fixed contact thereof. Accordingly, in this case, the innermost position switch 8 changes to its OFF state.

As shown in FIG. 2, the prior-art CD player includes a control circuit 9 having a microcomputer 10, a resistor 12, and a driver 14. The innermost position switch 8 is connected to the microcomputer via a pair of wiring lines 19A and 19B, and a 2-pin connector 18. The wiring lines 19A and 19B extend from the fixed contact and the movable contact of the innermost position switch 8, respectively.

The microcomputer 10 is connected to the traverse motor 2 via the driver 14. The microcomputer 10 controls the traverse motor 2 via the driver 14. It should be noted that illustrations of the gear train between the traverse motor 2 and the lead screw 3 are omitted from FIGS. 2 and 3 for clarity.

The optical pickup head 1 is electrically connected to the control circuit 9 via a set 15 of wiring lines, and a multi-pin connector 17. The wiring lines in the set 15 include a wiring line for enabling the generation of a laser beam, a wiring line for the transmission of an RF signal, and a wiring line for connection to a ground 16 in the control circuit 9.

As shown in FIG. 2, the wiring line 19A between the innermost position switch 8 and the microcomputer 10 is connected via the resistor 12 to a power feed line 11 subjected to a positive potential (a positive power supply voltage). The wiring line 19B is connected to a ground 13 at a position between the connector 18 and the microcomputer 10 in the control circuit 9. One terminal of the microcomputer 10 is grounded. In other words, one of wiring lines extending between the microcomputer 10 and the connector 18 is partially formed by a ground line.

As shown in FIG. 3, when the optical pickup head 1 is separate from its innermost position, the body of the optical pickup head 1 is also separate from the control arm of the innermost position switch 8 so that the switch 8 is in its OFF state. In this case, the potential of the wiring line 19A is high due to the power feed from the line 11 via the resistor 12, and hence a high-level signal is applied to the microcomputer 10 via the wiring lines 19A and 19B as an indication that the optical pickup head 1 is separate from its innermost position.

As shown in FIG. 2, when the optical pickup head 1 assumes its innermost position, the body of the head 1 engages the control arm of the innermost position switch 8 so that the switch 8 changes to its ON state. In this case, the wiring line 19A is shunted or short-circuited to the ground 13 via the innermost position switch 8 and the wiring line 19B, and hence the potential of the wiring line 19A goes low. Therefore, a low-level signal is applied to the microcomputer 10 via the wiring lines 19A and 19B as an indication that the optical pickup head 1 reaches its innermost position.

The microcomputer 10 monitors the potential of the wiring line 19A relative to a ground potential to detect whether the innermost position switch 8 is in its ON state or its OFF state, that is, whether or not the optical pickup head 1 reaches its innermost position. When it is detected that the optical pickup head 1 reaches its innermost position, the microcomputer 10 instructs the driver 14 to reverse the traverse motor 2. As a result, the optical pickup head 1 stops and then starts to move back toward its outermost position.

In the prior-art CD player of FIGS. 1–3, the innermost position switch 8 is connected to the microcomputer 10 via a pair of the wiring lines 19A and 19B, and the 2-pin connector 18. A simpler connection between the innermost position switch 8 and the microcomputer 10 has been desired.

First Embodiment

Figure 4:
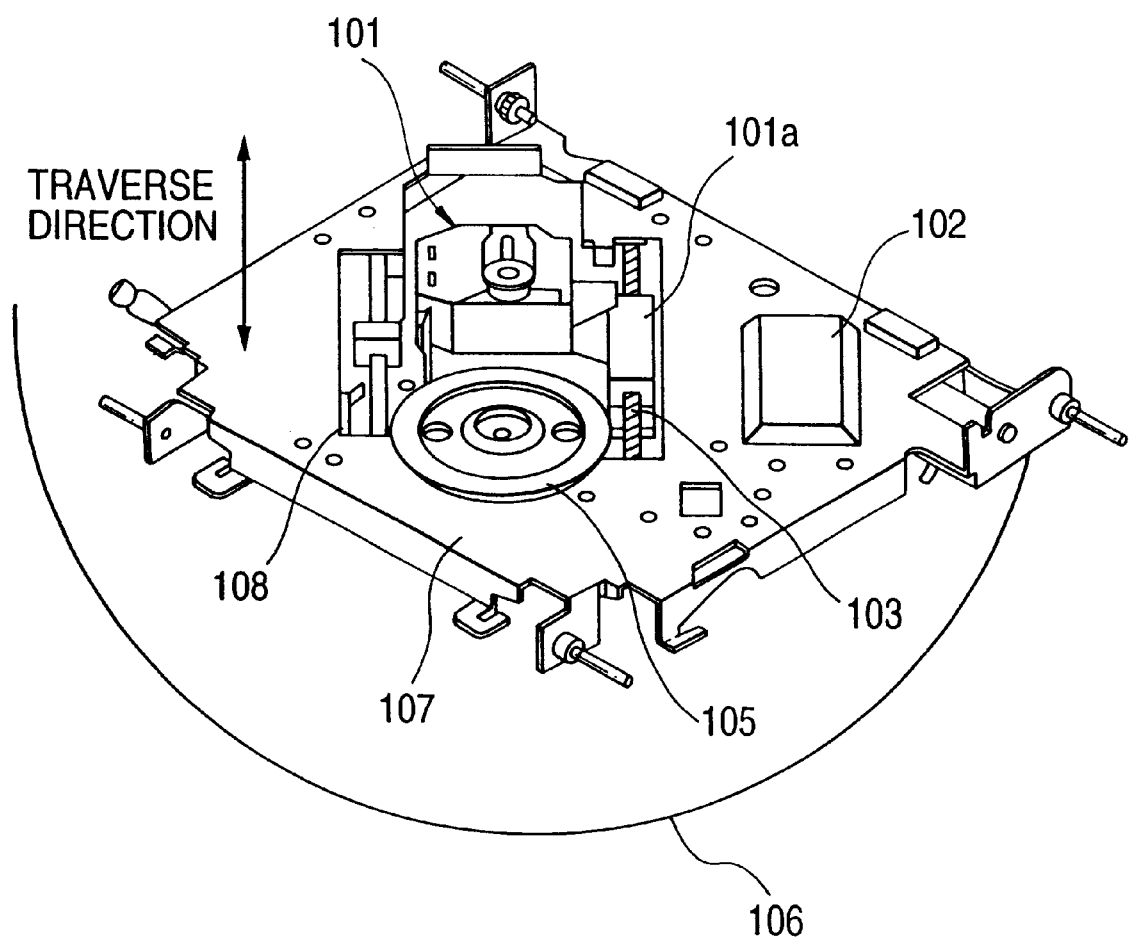
FIG. 4 is a perspective view of a portion of an optical disc drive apparatus according to a first embodiment of this invention.

FIG. 4 shows a portion of an optical disc drive apparatus according to a first embodiment of this invention. Examples of the optical disc drive apparatus are a CD (compact disc) drive apparatus, an MD (mini disc) drive apparatus, a DVD (digital versatile disc) drive apparatus, a CD player, an MD player, and a DVD player.

The portion of the optical disc drive apparatus in FIG. 4 is assembled on a suspension chassis 107. As shown in FIG. 4, an optical pickup head 101, a traverse motor 102, a lead screw 103, and a guide shaft 104 are provided on the suspension chassis 107.

The optical pickup head 101 can move along a traverse direction between a predetermined innermost position and a predetermined outermost position with respect to a disc 106 placed in the apparatus. The guide shaft 104 extends along the traverse direction. The optical pickup head 101 has a portion engaging the guide shaft 104. The optical pickup head 101 is guided by the guide shaft 104 during its movement in the traverse direction.

The optical pickup head 101 includes an engagement portion 101a having a threaded hole through which the lead screw 103 extends. The engagement portion 101a meshes with the lead screw 103. The lead screw 103 is coupled to an output shaft of the traverse motor 102 via a gear train so that the lead screw 103 can be rotated by the traverse motor 102. As the lead screw 103 rotates, the optical pickup head 101 moves in the traverse direction.

The disc 106 can be held in position by a disc damper 105 provided on the suspension chassis 107. When the disc 106 is placed in the apparatus, the disc 106 is held by the disc damper 105. Then, the optical pickup head 101 is moved to its innermost position.

The optical disc drive apparatus in FIG. 4 includes a first innermost position switch 108 which is provided on the suspension chassis 107 near an end of the guide shaft 104. The first innermost position switch 108 has a control arm 108a, a return spring, and a pair of a fixed contact and a movable contact. The control arm 108a is made of insulating material. The return spring urges the control arm 108a. The return spring causes the first innermost position switch 108 to be normally in its OFF state. In the first innermost position switch 108, the movable contact is connected with and disconnected from the fixed contact in accordance with movement of the control arm 108a.

Figure 5:
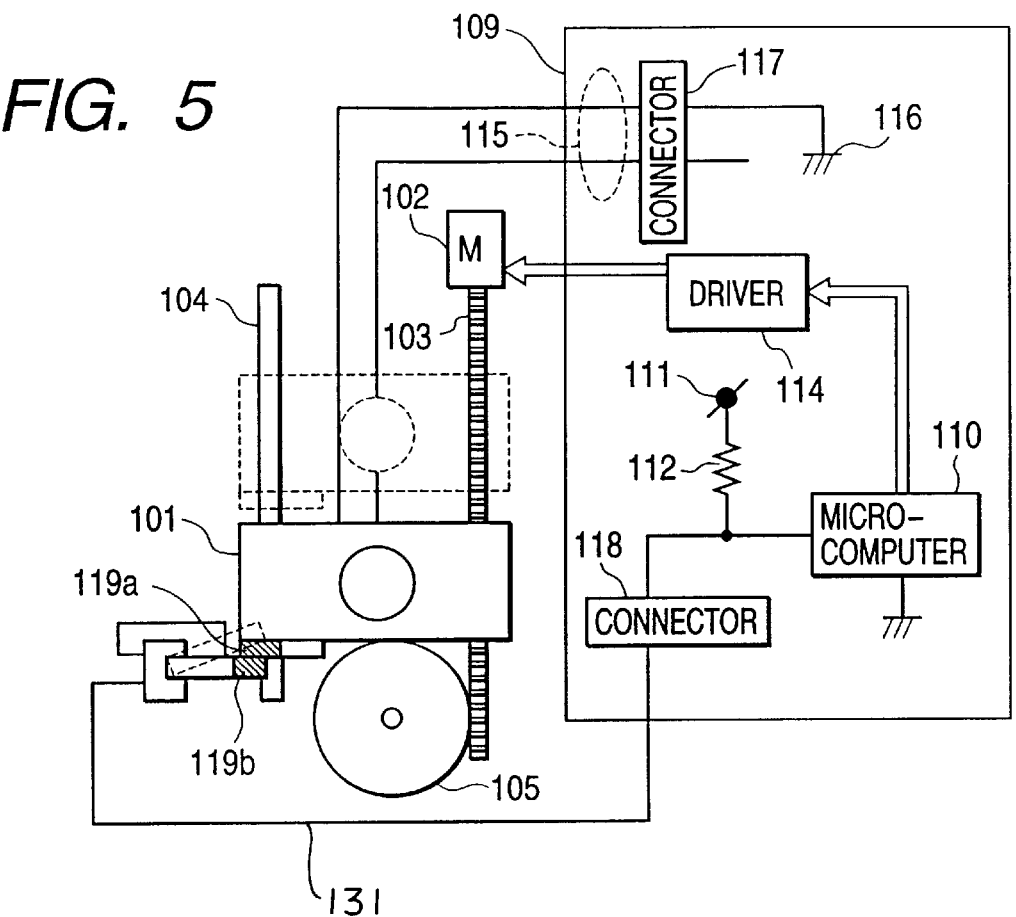
FIG. 5 is a diagram of an optical pickup head, a traversing mechanism for the head, and a control circuit in the optical disc drive apparatus of FIG. 4.
Figure 6:
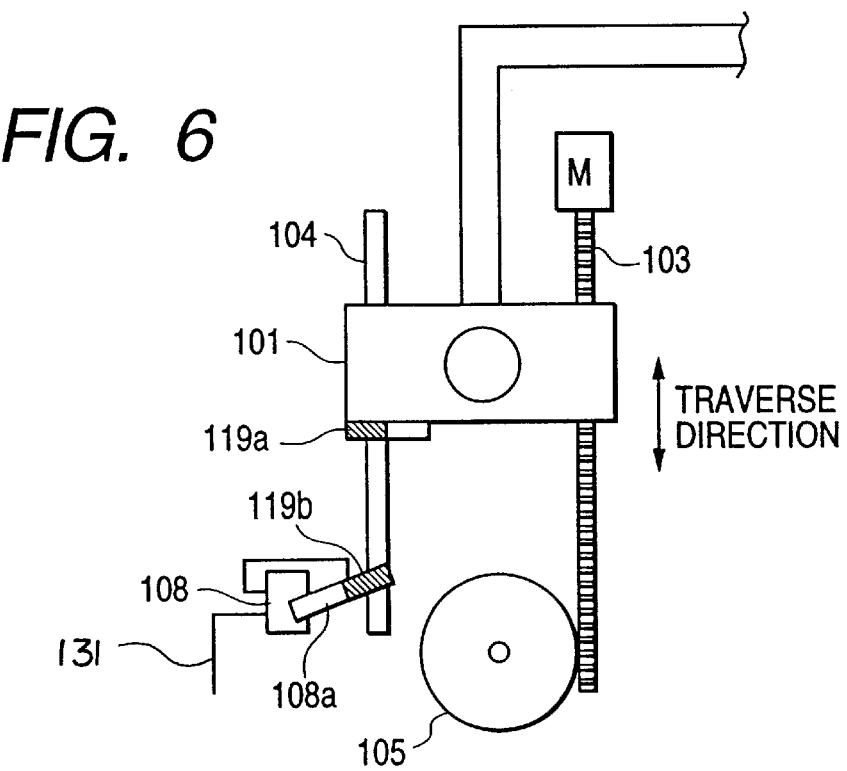
FIG. 6 is a diagram of the optical pickup head and the traversing mechanism for the head in the optical disc drive apparatus of FIG. 4.

As shown in FIGS. 5 and 6, a first electrically conductive member (a first switch contact) 119a is attached to the body of the optical pickup head 101. A second electrically conductive member (a second switch contact) 119b is mounted on the control arm 108a of the first innermost position switch 108. The first electrically conductive member 119a is connected with and disconnected from the second electrically conductive member 119b in accordance with traverse of the optical pickup head 101. The first and second electrically conductive members 119a and 119b compose a second innermost position switch.

As shown in FIG. 5, when the optical pickup head 101 reaches its innermost position, the first electrically conductive member 119a encounters the second electrically conductive member 119b and then forces the second electrically conductive member 119b together with the control arm 108a of the first innermost position switch 108. Accordingly, in this case, both the first innermost position switch 108 and the second innermost position switch change to their ON states.

As shown in FIG. 6, when the optical pickup head 101 moves from its innermost position, the first electrically conductive member 119a separates from the second electrically conductive member 119b. At the same time, the first innermost position switch 108 returns to its OFF state. Accordingly, in this case, both the first innermost position switch 108 and the second innermost position switch change to their OFF states.

As shown in FIG. 5, the optical disc drive apparatus includes a control circuit 109 having a microcomputer 110, a resistor 112, and a driver 114. The first innermost position switch 108 is connected to a specified terminal of the microcomputer 110 via a wiring line 131 and a 1-pin connector 118. The 1-pin connector 118 is interposed in the wiring line 131. When the 1-pin connector 118 is in its normal state, the wiring line 131 extends through the connector 118. The wiring line 131 extends from the fixed contact of the first innermost position switch 108. Alternatively, the wiring line 131 may extend from the movable contact of the first innermost position switch 108.

The microcomputer 110 is connected to the traverse motor 102 via the driver 114. The microcomputer 110 controls the traverse motor 102 via the driver 114. It should be noted that illustrations of the gear train between the traverse motor 102 and the lead screw 103 are omitted from FIGS. 5 and 6 for clarity.

The optical pickup head 101 is electrically connected to the control circuit 109 via a set 115 of wiring lines, and a multi-pin connector 117. The multi-pin connector 117 is interposed in the wiring line set 115. When the multi-pin connector 117 is in its normal state, the wiring lines in the set 115 extend through the connector 117. The wiring lines in the set 115 include a wiring line for enabling the generation of a laser beam, a wiring line for the transmission of an RF signal, and a wiring line for connection to a ground 116 in the control circuit 109.

As shown in FIG. 5, the wiring line 131 between the first innermost position switch 108 and the microcomputer 110 is connected via the resistor 112 to a power feed line 111 subjected to a positive potential (a positive power supply voltage). One terminal of the microcomputer 110 is grounded.

The first electrically conductive member 119a is electrically connected to the body of the optical pickup head 101. The body of the optical pickup head 101 is electrically connected to the ground within the control circuit 109 via one of the wiring lines in the set 115. Thus, the first electrically conductive member 119a is electrically connected to the ground 116 in the control circuit 109. The second electrically conductive member 119b is electrically connected to the movable contact of the first innermost position switch 108 via a lead. Alternatively, the second electrically conductive member 119b may be electrically connected to the fixed contact of the first innermost position switch 108 via a lead.

As shown in FIG. 6, when the optical pickup head 101 is separate from its innermost position, the first electrically conductive member 119a on the body of the optical pickup head 101 is also separate from the second electrically conductive member 119b on the control arm 108a of the first innermost position switch 108. Thus, both the first innermost position switch 108 and the second innermost position switch are in their OFF states. In this case, the potential of the wiring line 131 is high due to the power feed from the line 111 via the resistor 112, and hence a high-level signal is applied to the microcomputer 110 via the wiring line 131 as an indication that the optical pickup head 101 is separate from its innermost position.

As shown in FIG. 5, when the optical pickup head 101 assumes its innermost position, the first electrically conductive member 119a on the body of the head 101 engages the second electrically conductive member 119b on the control arm 108a of the innermost position switch 108 so that both the first innermost position switch 108 and the second innermost position switch change to their ON states. In this case, the wiring line 131 is shunted or short-circuited to the ground 116 via the first innermost position switch 108, the first electrically conductive member 119a, the second electrically conductive member 119b, the body of the optical pickup head 101, and one of the wiring lines in the set 115. Accordingly, the potential of the wiring line 131 goes low. Therefore, a low-level signal is applied to the microcomputer 110 via the wiring line 131 as an indication that the optical pickup head 101 reaches its innermost position.

The microcomputer 110 monitors the potential of the wiring line 131 relative to a ground potential to detect whether or not the optical pickup head 101 reaches its innermost position. When it is detected that the optical pickup head 101 reaches its innermost position, the microcomputer 110 instructs the driver 114 to reverse the traverse motor 102. As a result, the optical pickup head 101 stops and then starts to move back toward its outermost position.

In the optical disc drive apparatus of FIGS. 4–6, the first innermost position switch 108 is connected to the microcomputer 110 via the wiring line 131 and the 1-pin connector 118. Accordingly, there is provided a simpler connection between the first innermost position switch 108 and the microcomputer 110.

Preferably, at least one of the first and second electrically conductive members 119a and 119b has a suitable resiliency. Alternatively, the first electrically conductive member 119a may be connected to the body of the optical pickup head 101 via a resilient member. Similarly, the second electrically conductive member 119b may be connected to the control arm 108a of the first innermost position switch 108 via a resilient member.

The second electrically conductive member 119b may be connected to the wiring line 131 in such a manner as to bypass the first innermost position switch 108.

The optical disc drive apparatus in FIGS. 4–6 includes an outermost position switch arrangement (not shown) for detecting whether or not the optical pickup head 101 reaches its outermost position. The outermost position switch arrangement is basically similar in design to the combination of the first innermost position switch 108 and the second innermost position switch. The outermost position switch arrangement is electrically connected to the control circuit 109 and the microcomputer 110 in a manner similar to the connection of the first innermost position switch 108 and the second innermost position switch to the control circuit 109 and the microcomputer 110.

Second Embodiment

Figure 7:
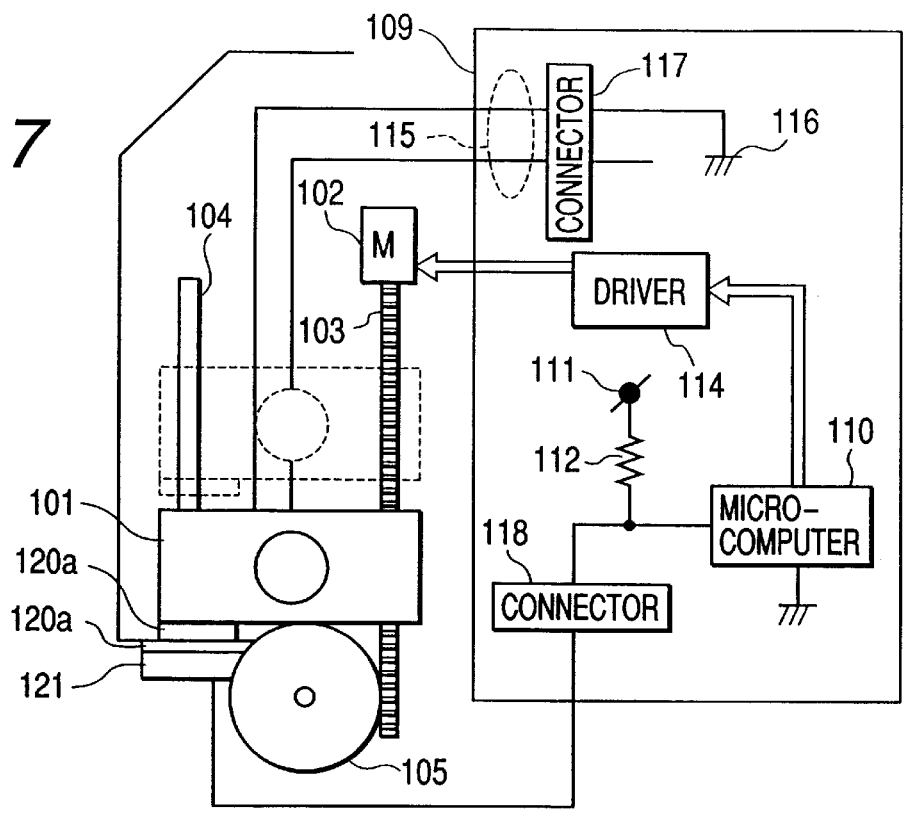
FIG. 7 is a diagram of an optical pickup head, a traversing mechanism for the head, and a control circuit in an optical disc drive apparatus according to a second embodiment of this invention.

FIG. 7 shows a portion of an optical disc drive apparatus according to a second embodiment of this invention. The optical disc drive apparatus in FIG. 7 is similar to the optical disc drive apparatus in FIGS. 4–6 except for design changes indicated hereinafter. The first innermost position switch 108 (see FIGS. 4–6) is omitted from the optical disc drive apparatus in FIG. 7.

Figure 8:
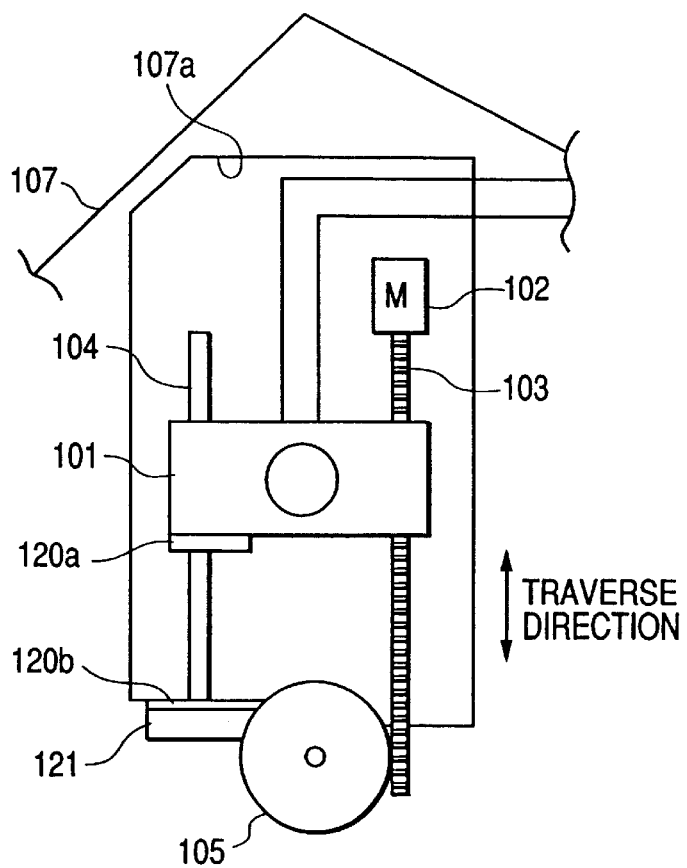
FIG. 8 is a diagram of the optical pickup head and the traversing mechanism for the head in the optical disc drive apparatus of the second embodiment of this invention.

As shown in FIGS. 7 and 8, a first electrically conductive member (a first switch contact) 120a is attached to the body of an optical pickup head 101. A suspension chassis 107 has an opening 107a for allowing traverse of the optical pickup head 101. An insulating member 121 is mounted on a potion of the suspension chassis 107 near an edge of the opening 107a. A second electrically conductive member (a second switch contact) 120b is provided on the insulating member 121. The first electrically conductive member 120a is connected with and disconnected from the second electrically conductive member 120b in accordance with traverse of the optical pickup head 101. The first and second electrically conductive members 120a and 120b compose an innermost position switch.

As shown in FIG. 7, when the optical pickup head 101 reaches its innermost position, the first electrically conductive member 120a encounters the second electrically conductive member 120b. Accordingly, in this case, the innermost position switch changes to its ON state.

As shown in FIG. 8, when the optical pickup head 101 moves from its innermost position, the first electrically conductive member 120a separates from the second electrically conductive member 120b. Accordingly, in this case, the innermost position switch changes to its OFF state.

As shown in FIG. 7, the first electrically conductive member 120a is electrically connected to the body of the optical pickup head 101. The body of the optical pickup head 101 is electrically connected to a ground 116 in a control circuit 109 via one of a wiring lines in a set 115. Thus, the first electrically conductive member 120a is electrically connected to the ground 116 in the control circuit 109. The second electrically conductive member 120b is electrically connected to a specified terminal of a microcomputer 110 in the control circuit 109 via a wiring line 131 and a 1-pin connector 118. The wiring line 131 between the innermost position switch and the microcomputer 110 is connected via a resistor 112 to a power feed line 111 subjected to a positive potential (a positive power supply voltage). Another terminal of the microcomputer 110 is grounded.

As shown in FIG. 8, when the optical pickup head 101 is separate from its innermost position, the first electrically conductive member 120a on the body of the optical pickup head 101 is also separate from the second electrically conductive member 120b. Thus, the innermost position switch is in its OFF state. In this case, the potential of the wiring line 131 is high due to the power feed from the line 111 via the resistor 112, and hence a high-level signal is applied to the microcomputer 110 via the wiring line 131 as an indication that the optical pickup head 101 is separate from its innermost position.

As shown in FIG. 7, when the optical pickup head 101 assumes its innermost position, the first electrically conductive member 120a on the body of the head 101 engages the second electrically conductive member 120b so that the innermost position switch changes to its ON state. In this case, the wiring line 131 is shunted or short-circuited to the ground 116 via the innermost position switch, the body of the optical pickup head 101, and one of the wiring lines in the set 115. Accordingly, the potential of the wiring line 131 goes low. Therefore, a low-level signal is applied to the microcomputer 110 via the wiring line 131 as an indication that the optical pickup head 101 reaches its innermost position.

The microcomputer 110 monitors the potential of the wiring line 131 relative to a ground potential to detect whether or not the optical pickup head 101 reaches its innermost position. When it is detected that the optical pickup head 101 reaches its innermost position, the microcomputer 110 instructs a driver 114 to reverse a traverse motor 102. As a result, the optical pickup head 101 stops and then starts to move back toward its outermost position.

In the optical disc drive apparatus of FIGS. 7 and 8, the innermost position switch is connected to the microcomputer 110 via the wiring line 131 and the 1-pin connector 118. Accordingly, there is provided a simpler connection between the innermost position switch and the microcomputer 110.

Preferably, at least one of the first and second electrically conductive members 120a and 120b has a suitable resiliency.

Alternatively, the first electrically conductive member 120a may be connected to the body of the optical pickup head 101 via a resilient member. Similarly, the second electrically conductive member 120b may be connected to the insulating member 121 via a resilient member.

The optical disc drive apparatus in FIGS. 7 and 8 includes an outermost position switch (not shown) for detecting whether or not the optical pickup head 101 reaches its outermost position. The outermost position switch is basically similar in design to the innermost position switch. The outermost position switch is electrically connected to the control circuit 109 and the microcomputer 110 in a manner similar to the connection of the innermost position switch to the control circuit 109 and the microcomputer 110.

What is claimed is:

1. An apparatus for detecting a position of a movable optical pickup head, comprising:

a first electrically conductive member;

a second electrically conductive member provided on a body of the optical pickup head, the second electrically conductive member moving into contact with the first electrically conductive member when the optical pickup head reaches a predetermined limit position, the second electrically conductive member moving out of contact with the first electrically conductive member when the optical pickup head separates from the predetermined limit position;

a microcomputer including first and second terminals, the first terminal being grounded;

means for electrically connecting the first electrically conductive member to the second terminal of the microcomputer; and means for grounding the second electrically conductive member via the body of the optical pickup head;

wherein the connecting means consists of a single wiring line and a 1-pin connector, the wiring line extending between the first electrically conductive member and the second terminal of the microcomputer, the 1-pin connector being interposed in the wiring line.

2. An apparatus as recited in claim 1, further comprising a power feed line subjected to a positive potential, and a resistor connected between the power feed line and the first electrically conductive member.

3. An apparatus for detecting a position of a movable optical pickup head, comprising:

a first electrically conductive member;

a second electrically conductive member provided on and electrically connected to a body of the optical pickup head, the second electrically conductive member moving into contact with the first electrically conductive member when the optical pickup head reaches a predetermined limit position, the second electrically conductive member moving out of contact with the first electrically conductive member when the optical pickup head separates from the predetermined limit position;

a microcomputer including first and second terminals, the first terminal being grounded;

means for electrically connecting the first electrically conductive member to the second terminal of the microcomputer; and means for grounding the second electrically conductive member via the body of the optical pickup head to electrically connect the second electrically conductive member and the first terminal of the microcomputer by an electrically conductive path whose positions are formed by the body of the optical pickup head and the ground;

wherein the connecting means consists of a single wiring line and a 1-pin connector, the wiring line extending between the first electrically conductive member and the second terminal of the microcomputer, the 1-pin connector being interposed in the wiring line.

4. An apparatus as recited in claim 3, further comprising a power feed line subjected to a positive potential, and a resistor connected between the power feed line and the first electrically conductive member.

* * * * *